(No Model.)

H. B. CARLTON.
PHOTOGRAPHIC FINDER.

No. 605,245. Patented June 7, 1898.

Attest:
M. L. Winston
M. V. Sayler

Inventor:
H. B. Carlton,
By E. B. Whitmore,
Atty.

THE NORRIS PETERS CO., PHOTO-LITHO., WASHINGTON, D. C.

UNITED STATES PATENT OFFICE.

HARVEY B. CARLTON, OF ROCHESTER, NEW YORK.

PHOTOGRAPHIC FINDER.

SPECIFICATION forming part of Letters Patent No. 605,245, dated June 7, 1898.

Application filed March 27, 1897. Serial No. 629,599. (No model.)

*To all whom it may concern:*

Be it known that I, HARVEY B. CARLTON, of Rochester, in the county of Monroe and State of New York, have invented a new and useful Improvement in Finders for Photographic Cameras, which improvement is fully set forth in the following specification and shown in the accompanying drawings.

My invention relates to finders for photographic cameras. In applying it to such use I form the upper surface of the horizontal ground glass over the mirror concave or in the form of a shallow cup or basin and place therein a small spherical body—as, for instance, a steel ball as nearly as possible in the form of a perfect sphere. When the finder is thus constructed, the artist when looking downward at the ground glass to observe the view he is taking of an object or a landscape sees also the ball and its position upon the ground glass and is thus enabled to see exactly how his camera stands as to horizontality, or, in other words, in thus looking into the finder he sees the image of the object in view and the position of the ball at once and without shifting or changing his sight.

The invention is hereinafter fully described and more particularly pointed out in the claims.

Figure 1:
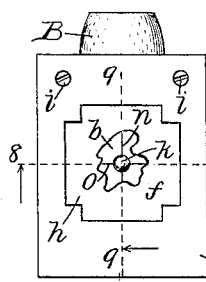
Figure 2:
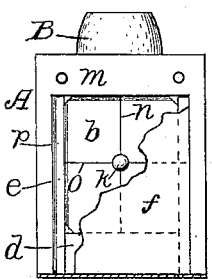
Figure 3:
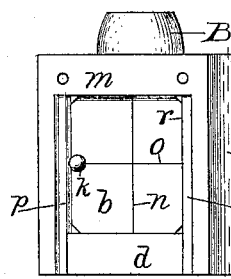
Figure 4:
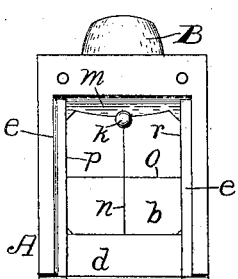
Figure 5:
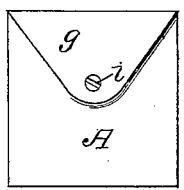
Figure 6:
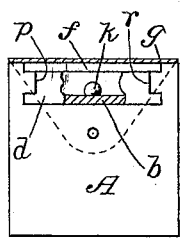
Figure 7:
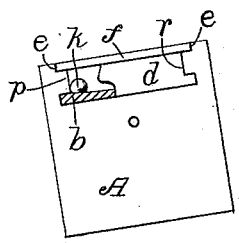
Figure 8:
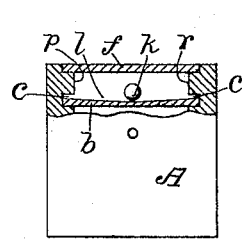
Figure 9:
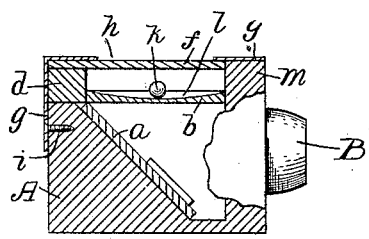
Figure 11:
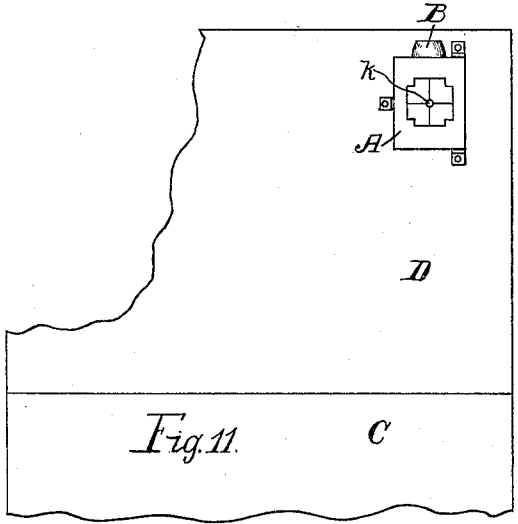
Figure 10:
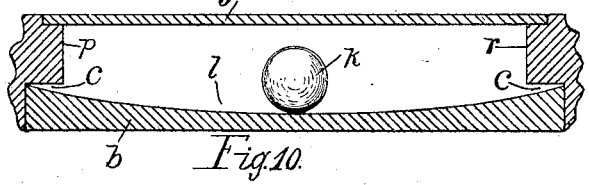

Referring to the drawings, Figure 1 is a plan of the finder with a part of the upper transparent glass broken away. Fig. 2 is a plan of the same with the metal guard horizontally sectioned away and the transparent glass partly broken away to expose the parts beneath. Fig. 3 shows the device with both the metal guard and transparent glass removed, the finder being tipped slightly toward the left. Fig. 4 shows the device with the guard and upper glass removed, the finder being tipped slightly toward the front. Fig. 5 is an end elevation, seen as indicated by arrow 5 in Fig. 1. Fig. 6 is a similar end elevation, the metal guard being vertically sectioned at the rear end of the finder and a part of the retaining-block broken away. Fig. 7 is a rear end view, the finder being in an inclined position and the guard omitted and a part of the retaining-block broken away. Fig. 8 is a rear end view, the upper parts being transversely sectioned through the center, as on the dotted line 8 8 in Fig. 1. Fig. 9 is a side elevation, mainly in central longitudinal section, as on the dotted line 9 9 in Fig. 1. Fig. 10, drawn to an exaggerated scale, shows a vertical longitudinal section of the ground glass and the ball placed thereon. Fig. 11, drawn to a small scale, is an outline plan of a part of the front of a camera-box and the bed with the finder in place thereon.

Referring to the parts shown, A is the body of the finder, which is commonly made of wood, hollow, and provided with the usual tube B, holding a lens, and an internal inclined mirror $a$.

$b$ is the horizontal ground glass over the mirror, resting in horizontal grooves $c$, Fig. 8, in the side walls of the finder and confined by a retaining-block $d$, formed with lips at its ends to occupy the grooves $c$. The body is formed with horizontal rests $e$ at its upper side to receive the rectangular sheet $f$ of plain transparent glass. A sheet-metal guard $g$ covers the upper surface of the finder, it being bent downward against the rear end of the body to hold the glass plates and retaining-block in place. The guard is held to place by ordinary screws $i$ and formed with the usual rectangular opening $h$ centrally over the ground glass.

Heretofore in these finders the ground glass $b$ has been made plain on both its upper and lower surfaces, the glass being of uniform thickness, against the under surface of which the image is reflected from the inclined mirror $a$. Instead of making the ground glass in this form I concave its upper side, forming thereon a shallow basin $l$, in which I place a sphere $k$, preferably of polished steel, as shown in the various figures. The exact nature or form of the concavity $l$ is not essential to the invention—that is to say, it may be of spherical or elliptical curvature or of the form of either of the other conic sections, as may be found most desirable or best calculated for the use intended; also, the sharpness of the curve, whatever its mathematical character, may be varied according to circumstances or to fit the device to any particular case or use to which it may be applied. The shallower the concavity in any case the more sensitive will the instrument be.

It will be understood that with the ball in the concavity or hollow $l$ the instrument is a universal level, for the ball will always roll to and come to rest at any point upon the glass which may be lowest in any given position of the instrument, and thus serve at all times to test the horizontality of the finder. I form the ground glass, which is translucent or pervious to light, with cross-marks n o, visible on account of the transmitted light, intersecting at right angles at the middle or lowest point of the basin or hollow, and when the finder is held so that the ball rests over the intersecting point of these lines, for example, as shown in Figs. 1 and 2, the under surface of the ground glass will coincide with a horizontal plane and the finder will be truly horizontal.

The ball or sphere when upon the ground glass is surrounded by four retaining-walls m d p r, forming a rectangular inclosure, and the transparent glass f over the ball completes its confinement, so that it cannot escape. The cross-mark n upon the ground glass is parallel with the opposing side walls p r, and the cross-mark o is parallel with the opposing end walls m d, the latter being above referred to as and called the "retaining-block." Should it be wished at any time to tilt or depress the forward end of the finder, for instance, but to have its transverse axis horizontal, the action of the ball will enable the artist to do so with a great degree of exactness. In this position of the finder the ball will roll toward (or against, as the case may be) the forward retaining-wall m of the inclosure, as shown in Fig. 4, resting at some point over the line n if the transverse axis of the finder be horizontal. Similarly if the finder be tilted backward the ball will roll toward or against the rear wall or retaining-block d, the horizontality of the transverse axis being proven by the ball remaining at rest over the line n. Furthermore, by tilting the finder toward the left, for example, as appears in Figs. 3 and 7, the ball will move in that direction and come to rest over the line o at some point at the left of the intersecting point of the lines n o if the longitudinal axis of the finder be truly horizontal; and if the finder be tipped toward the right the ball would act correspondingly on the right of the intersecting point of the lines n o. Should the finder at any time occupy a position in which neither the longitudinal nor the transverse axis is horizontal, the ball would rest somewhere upon the ground glass away from the intersecting lines n o.

The finder when employed in connection with cameras is secured to some convenient place upon the camera-box C or upon the inner surface of the bed D of the box, as indicated in outline in Fig. 11, the longitudinal axis of the finder in every case being made parallel with the axis or the "view" of the camera. In using finders with cameras the images or figures of the objects in view appear simultaneously in both the camera and the finder; and by hollowing the ground glass of the finder, as shown and described, and employing a ball thereon the latter appears directly over or upon the image, so both the image and the ball are seen by the artist at once.

What I claim as my invention is—

1. A finder for a camera, consisting of a body having a lens-tube and a mirror, in combination with a plate pervious to light above the mirror, the plate being made hollow at its upper surface and a body adapted to roll placed therein, substantially as shown and described.

2. A finder for a camera, consisting of a hollow body provided with a lens-tube and an inclined mirror, in combination with a plate pervious to light, above the mirror, the plate being made hollow at its upper surface, and a body, as a sphere, adapted to roll placed in said hollow, and four retaining walls or sides together forming a rectangular inclosure for the sphere, substantially as shown and described.

3. A finder for a camera, consisting of a body provided with a lens-tube and a mirror, in combination with a plate pervious to light, above the mirror, made hollow at its upper surface, and a body, as a sphere, adapted to roll placed in said hollow, and four walls or sides together forming a rectangular inclosure for the sphere, the plate being provided with two intersecting lines one parallel with two opposing retaining walls or sides and the other parallel with the remaining two walls or sides, substantially as specified.

4. In combination a lens and an inclosed mirror, a plate pervious to light, above the mirror, made hollow at its upper surface, and a body, as a sphere, adapted to roll placed in said hollow, and means for confining said sphere upon the plate, substantially as shown and described.

5. In a finder for cameras, the combination, with a support, of a plate therein pervious to light, the upper surface of the plate being hollowed, a body adapted to roll within the hollow, and means for passing rays of light through the plate from the bottom to form an image, substantially as set forth.

6. In a finder for cameras, the combination, with a lens-tube provided with an inclosure, the bottom of the inclosure being pervious to light and having its upper surface hollowed, of a spherical body within the hollow, and means for passing rays of light through the plate from within the tube to form an image, substantially as described.

7. The combination, with a camera, of a lens-tube, provided with an inclosure, the bottom of said inclosure being pervious to light and having its upper surface provided with a hollow, of a spherical body within the hollow, and a mirror within the tube below the bottom of the inclosure and adapted to throw rays of light through said bottom, substantially as set forth.

8. The combination, with a camera, of a tube secured thereto, provided with an inclosure, the bottom of the inclosure being pervious to light and hollow upon its upper surface, the hollow portion being provided with intersecting lines, of a spherical body within the hollow, and an inclined reflector below the bottom of the inclosure, substantially as set forth.

In witness whereof I have hereunto set my hand, this 23d day of March, 1897, in the presence of two subscribing witnesses.

HARVEY B. CARLTON.

Witnesses:
ENOS B. WHITMORE,
M. L. WINSTON.